(12) United States Patent
Kaneko et al.

(10) Patent No.: US 6,362,720 B1
(45) Date of Patent: Mar. 26, 2002

(54) CHIP TYPE VARISTOR AND METHOD OF MANUFACTURING THE SAME

(75) Inventors: Kazuhiro Kaneko; Kazutaka Nakamura, both of Shiga-ken (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/023,683

(22) Filed: Feb. 13, 1998

(30) Foreign Application Priority Data

Feb. 17, 1997 (JP) ............................................... 9-032026

(51) Int. Cl.[7] .............................. H01C 7/10; H01C 7/13
(52) U.S. Cl. ......................... 338/21; 338/20; 338/308; 252/518
(58) Field of Search ........................... 338/20, 21, 308, 338/330, 309; 252/518, 519, 520, 521

(56) References Cited

U.S. PATENT DOCUMENTS

| 4,270,085 A | * | 5/1981 | Terada et al. ............. 324/65 R |
| 4,736,183 A | * | 4/1988 | Yamazaki et al. ............ 338/20 |
| 4,943,795 A | * | 7/1990 | Yamazaki et al. ............ 338/21 |
| 4,996,510 A | * | 2/1991 | Becker et al. ................ 338/21 |
| 5,008,646 A | * | 4/1991 | Hennings et al. ............. 338/20 |
| 5,039,971 A | * | 8/1991 | Imai et al. ................... 338/21 |
| 5,062,993 A | * | 11/1991 | Arnold, Jr. et al. ......... 257/518 |
| 5,119,062 A | * | 6/1992 | Nakamura et al. ............ 338/20 |
| 5,476,714 A | * | 12/1995 | Hyatt ......................... 428/402 |

FOREIGN PATENT DOCUMENTS

| EP | 0009825 A1 | 10/1979 |
| EP | 0165821 A2 | 6/1985 |
| JP | 52-367889 A | 3/1977 |

OTHER PUBLICATIONS

"Tovarnye Znaki", Izobert, Chemical Abstract, vol. 68, No. 12, Mar. 18, 1968.*

Chemical Abstracts; vol. 68, No. 12, Mar. 18, 1968; Columbus, Ohio, US; Abstract No. 54854; IZOBRET: "Tovarnye Znaki" XP002075552 & SU 198 436A (S.S.R.E.I.) Jun. 28, 1967.

* cited by examiner

*Primary Examiner*—Lincoln Donovan
*Assistant Examiner*—Kyung S. Lee
(74) *Attorney, Agent, or Firm*—Ostrolenk, Faber, Gerb & Soffen, LLP

(57) ABSTRACT

There is provided a varistor having high surge resisting capability in spite of its small size and a method of manufacturing the same. The varistor is mainly composed of zinc oxide and contains a composite oxide expressed by the chemical formula $Zn_2SnO_4$. It is manufactured using a method wherein zinc oxide and tin oxide are mixed; the mixture is subjected to a thermal process thereafter to obtain a composite oxide expressed by the chemical formula $Zn_2SnO_4$; and the composite oxide is combined with the zinc oxide which is the main component and a thermal process is performed to obtain a raw material for the varistor.

13 Claims, 4 Drawing Sheets

US 6,362,720 B1

CHIP TYPE VARISTOR AND METHOD OF MANUFACTURING THE SAME

BACKGROUND OF THE INVENTION

1. Field of the Invention

The present invention relates to a varistor (variable resistor), specifically to a varistor mainly composed of zinc oxide and a method of manufacturing the same.

2. Description of the Related Art

A varistor is a circuit element whose resistance abruptly decreases when the voltage applied to the element exceeds a predetermined level. On the other hand, the resistance is extremely large when the applied voltage is lower than that level. Because of such characteristics, varistors are used for protecting semiconductor elements from a surge voltage, for example.

Resistance elements referred to as zinc oxide varistors which utilize voltage/current non-linearity are mainly composed of zinc oxide and are manufactured using a method wherein zinc oxide is combined with a plurality of additives, pulverized and mixed; the resultant fine particles are calcined to produce a ceramic raw material powder for varistors; and a body molded from the ceramic raw material powder is fired to provide varistor elements. Energy barriers are formed in boundary barrier layers in such a varistor element due to the presence of impurity energy levels formed at boundaries between zinc oxide particles, which results in excellent voltage/current non-linearity.

The voltage of a varistor element at the time when it exhibits the voltage/current non-linearity is referred to as the "varistor voltage", and the voltage that appears on an element when a current of 1 mA flows through the element is generally used as such a varistor voltage. Such a voltage is normally represented by "$V_{1mA}$".

The varistor's function of absorbing surge noises and electrostatic noises are attributable to its excellent voltage/current non-linearity. The surge noise absorbing capability of a varistor is evaluated using a current value at which the varistor element is broken when a sequentially increased surge current is applied to the varistor element. It serves as an important index that indicates the durability of a varistor element.

A varistor mainly composed of zinc oxide has excellent surge resisting capability which increases in proportion to the area of its electrode. However, no compact varistor element capable of resisting surge noises of 3000 A/cm$^2$ or more has been provided.

Meanwhile, there is an accelerated trend toward smaller electronic apparatus, e.g., the spread of mobile communication apparatus, which is accompanied by significant trend toward smaller electronic components and devices of various types. While this has resulted in an increased demand for smaller varistors, a reduction in the size of the varistor leads to a reduction in the effective area of the electrode thereof. For this reason, a need has arisen for varistor elements having improved surge resisting capability per unit area.

SUMMARY OF THE INVENTION

It is therefore an object of the present invention to provide a varistor having high surge resisting capability in spite of a reduced size and a method of manufacturing the same.

According to a first aspect of the invention, there is provided a ceramic composition characterized in that it is mainly composed of zinc oxide and contains a composite oxide expressed by the chemical formula $Zn_2SnO_4$.

According to a second aspect of the invention, there is provided a ceramic composition characterized in that it contains the composite oxide expressed by a chemical formula $Zn_2SnO_4$ in an amount in the range from about 0.01 to 20 mol %.

According to a third aspect of the invention, there is provided a ceramic composition characterized in that it is mainly composed of zinc oxide and contains bismuth oxide, cobalt oxide, manganese oxide and a composite oxide expressed by the chemical formula $Zn_2SnO_4$.

According to a fourth aspect of the invention, there is provided a ceramic composition characterized in that it contains about 0.10 to 2 mol % bismuth oxide, about 0.10 to 2 mol % cobalt oxide, about 0.10 to 2 mol % manganese oxide and about 0.01 to 20 mol % $Zn_2SnO_4$.

According to a fifth aspect of the invention, there is provided a varistor characterized in that it comprises a layered body formed by a plurality of ceramic layers mainly composed of zinc oxide containing a composite oxide expressed by the chemical formula $Zn_2SnO_4$, an inner electrode layer interposed between the ceramic layers of the layered body and an outer electrode formed on the surface of the layered body and electrically connected to the inner electrode layer.

According to a sixth aspect of the invention, there is provided a varistor characterized in that it contains the composite oxide expressed by the chemical formula $Zn_2SnO_4$ in an amount from about 0.01 to 20 mol %.

According to a seventh aspect of the invention, there is provided a varistor characterized in that it comprises a layered body formed by a plurality of ceramic layers mainly composed of zinc oxide containing bismuth oxide, cobalt oxide, manganese oxide and a composite oxide expressed by the chemical formula $Zn_2SnO_4$, an inner electrode layer interposed between the ceramic layers of the layered body and an outer electrode formed on the surface of the layered body and electrically connected to the inner electrode layer.

According to an eighth aspect of the invention, there is provided a varistor characterized in that it contains about 0.10 to 2 mol % bismuth oxide, about 0.10 to 2 mol % cobalt oxide, about 0.10 to 2 mol % manganese oxide and about 0.01 to 20 mol % $Zn_2SnO_4$.

According to a ninth aspect of the invention, there is provided a method of manufacturing a varistor characterized in that it comprises the steps of mixing zinc oxide and tin oxide, thermally processing the mixture thereafter to obtain a composite oxide expressed by the chemical formula $Zn_2SnO_4$, and combining the composite oxide with the zinc oxide which is the main component and thermally processing the combination to obtain a raw material for a varistor.

According to a tenth aspect of the invention, there is provided a method of manufacturing a varistor characterized in that the mixing ratio between the zinc oxide and tin oxide is about 2:1 in terms of mol ratio.

According to an eleventh aspect of the invention, there is provided a method of manufacturing a varistor characterized in that the mixture is subjected to a thermal process at 1100° C.

According to a twelfth aspect of the invention, there is provided a method of manufacturing a varistor characterized in that the composite oxide expressed by $Zn_2SnO_4$ is in an amount in the range from about 0.01 to 20 mol % relative to the zinc oxide which is the main component.

As described above, there is provided according to the present invention varistors and chip type varistors having high surge resisting capability by adding a composite oxide expressed by $Zn_2SnO_4$ to the zinc oxide which is the main component.

Further, by adding bismuth oxide, cobalt oxide and manganese oxide in addition to $Zn_2SnO_4$, there is provided varistors and chip type varistors which have not only improved surge resisting capability but also has excellent electrical characteristics such as non-linearity coefficient, electrostatic capacity and dielectric loss.

Further, according to the method of manufacture wherein zinc oxide and tin oxide are mixed; the mixture is subjected to a thermal process thereafter to obtain a composite oxide expressed by the chemical formula $Zn_2SnO_4$; and the composite oxide is added to the zinc oxide which is the main component and a thermal process is performed to obtain a raw material for a varistor, there is provided a raw material for a varistor which exhibits high surge resisting capability to allow manufacture of a reliable varistor.

DETAILED DESCRIPTION OF PREFERRED EMBODIMENTS

Figure 1A:
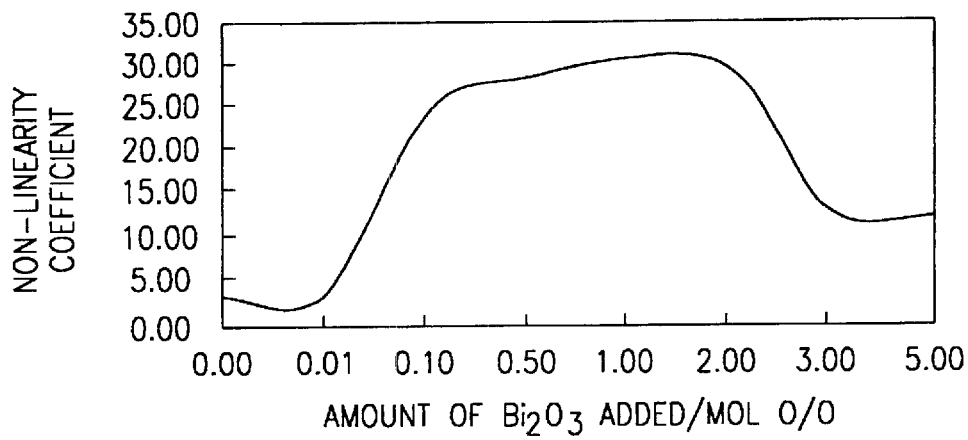
FIG. 1A is a graph showing the relationship between the amount of bismuth oxide added and the non-linearity coefficient according to the present invention.

A mode for carrying out the present invention will now be described with reference to a preferred embodiment thereof.

First, zinc oxide (ZnO) having purity of 99% or more and tin oxide ($SnO_2$) having purity of 99% or more were mixed at a mol ratio of 2:1. Any convenient ratio could have been used but it is most convenient to use a ratio close to stoichiometric. The mixture was combined with pulverizing media, pulverized and agitated in pure water, dehydrated and dried. Thereafter, the mixture was granulated and subjected to heating at 1200° C. to produce a $Zn_2SnO_4$ powder. In general, temperatures of at least about 1000 to 1300° C. can be used.

Next, ceramic raw material powders for varistors was produced.

Specifically, ceramic raw material powders for varistors were prepared by adding bismuth oxide ($Bi_2O_3$), cobalt oxide ($CO_3O_4$) and manganese oxide ($Mn_3O_4$) in predetermined amounts shown in Table 1 to zinc oxide (ZnO) having purity of 99% or more such that the components totaled to 100 mol % and by further adding the $Zn_2SnO_4$ powder. The samples marked with an asterisk in Table 1 are outside the scope of the invention.

TABLE 1

| Sample No. | Composition/mol % | | | | |
|---|---|---|---|---|---|
| | ZnO | $Bi_2O_3$ | $Co_3O_4$ | $Mn_3O_4$ | $Zn_2SnO_4$ |
| *1 | 97.50 | 0.50 | 1.00 | 1.00 | 0 |
| 2 | 97.49 | 0.50 | 1.00 | 1.00 | 0.01 |
| 3 | 97.40 | 0.50 | 1.00 | 1.00 | 0.10 |
| 4 | 97.00 | 0.50 | 1.00 | 1.00 | 0.50 |
| 5 | 96.50 | 0.50 | 1.00 | 1.00 | 1.00 |
| 6 | 92.50 | 0.50 | 1.00 | 1.00 | 5.00 |
| 7 | 87.50 | 0.50 | 1.00 | 1.00 | 10.00 |
| 8 | 77.50 | 0.50 | 1.00 | 1.00 | 20.00 |
| *9 | 67.50 | 0.50 | 1.00 | 1.00 | 30.00 |

The prepared ceramic raw material powders for varistors were combined with pulverizing media, pulverized and agitated in pure water, dehydrated and dried. Then, the raw material powders were granulated and calcined and were pulverized and hydrated in pure water and dried again to provide varistor materials.

Subsequently, chip type varistors were produced from those varistor materials. Specifically, the varistor materials were combined with a binder, plasticizer and a plurality of stabilizers in predetermined amounts in an organic solvent and were mixed to produce slurries which in turn were subjected to a doctor blade process to form green sheets having a thickness of about 10 µm for inner electrode layers and green sheets having a thickness of about 40 µm for outer layers.

Next, a conductive metal paste containing Pt was screen-printed on the surface of the green sheets to form inner electrode layers. A predetermined number of green sheets having an inner electrode layer printed thereon were stacked, and a predetermined number of green sheets on which the Pt conductive metal layer was absent were stacked on the upper and lower sides thereof. Thereafter, the product was bonded by pressing it in a press machine to produce a press-bonded green sheet body in the form of a block having a thickness of about 1 mm. Then, the press-bonded green sheet body was cut into a chip type varistor of a predetermined size.

Next, such chip type varistor elements were placed in a baking furnace and were baked for three hours at about 900 to 1200° C. after removing the binder by heating.

Thereafter, a terminal electrode made of Ag was formed at ends of the resultant baked chip type varistors to complete chip type varistors and establish electrical connection to the inner electrodes. The electrical characteristics of the varistors were then evaluated.

Figure 3:
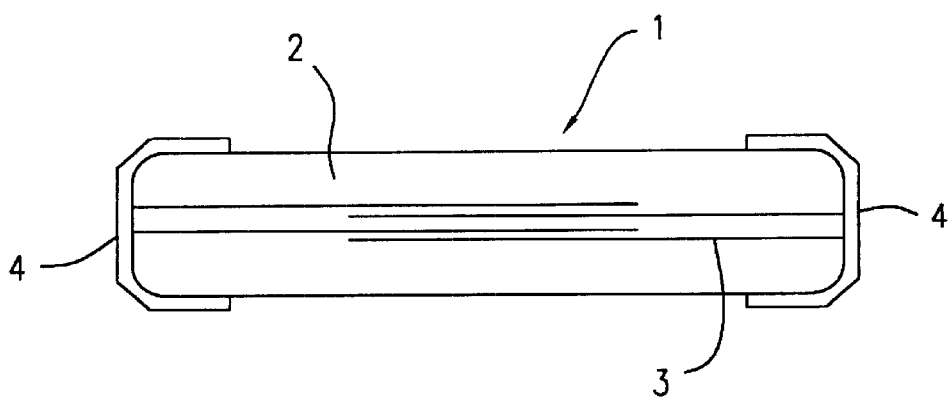
FIG. 3 is a sectional view of the varistor according to the present invention.

FIG. 3 shows a sectional view of the varistor 1. Inner electrodes 3 are formed in a ceramic layer 2 and outer electrodes 4 are applied onto the surface of the ceramic layer.

Specifically, measurement of the voltage-current characteristics was carried out to measure the varistor voltage ($V_{1mA}$) and non-linearity coefficient ($\alpha$) and to measure electrostatic capacity ($C_p$) and dielectric loss (D.F.) at a frequency of 1 MHz and a voltage of 1.0 V.

Next, surge resisting capability was measured. Specifically, a square wave current of 8/20 µsec. was successively applied four times at intervals of five minutes, and the surge resisting capability was the current value at the point in time when the change in the varistor voltage after the application of the current reached 10% of the initial value.

Table 2 shows the results of measurement of electrical characteristics, i.e., the varistor voltage ($V_{1mA}$), non-linearity coefficient ($\alpha$) and electrostatic capacity ($C_p$), and surge resisting capability (Ip). The sample numbers in Tables 1 and 2 correspond to each other.

TABLE 2

| Sample No. | $V_{1mA}$ | $\alpha$ | Cp(pF) | D.F.(%) | Ip (A/cm$^2$) |
|---|---|---|---|---|---|
| *1 | 6.3 | 42.1 | 380.3 | 4.20 | 2050 |
| 2 | 6.8 | 55.3 | 330.2 | 1.25 | 3050 |
| 3 | 6.8 | 54.2 | 328.2 | 1.21 | 3100 |
| 4 | 6.7 | 55.2 | 325.2 | 1.18 | 3150 |
| 5 | 6.7 | 55.4 | 324.6 | 1.26 | 3200 |
| 6 | 6.9 | 58.6 | 323.5 | 1.08 | 3600 |
| 7 | 6.8 | 55.3 | 323.0 | 1.15 | 3150 |
| 8 | 7.1 | 53.2 | 322.8 | 1.87 | 3150 |
| *9 | 7.2 | 28.2 | 300.1 | 12.56 | 2500 |

As apparent from the above results, when the $Zn_2SnO_4$ powder is used as an additive to a varistor raw material, a varistor having high surge resisting capability can be provided. On the contrary, when $Zn_2SnO_4$ is not added, the surge resisting capability does not reach 3000 A/cm$^2$ as indicated by sample No. 1. Further, when the amount of $Zn_2SnO_4$ added exceeds about 20 mol %, the surge resisting capability is below 3000 A/cm$^2$ as indicated by sample No. 9. Further, when $Zn_2SnO_4$ is not added, although the surge resisting capability is improved, it is not preferable because the non-linearity coefficient becomes small and the dielectric loss becomes high. The non-linearity coefficient and the dielectric loss are values that reflect the states of boundary levels and energy barriers, and deterioration of these values leads to deterioration of the performance of the varistor. Therefore, the preferable amount of $Zn_2SnO_4$ added is in the range from about 0.01 to 20 mol % and more preferably about 1–10 mol %.

A second embodiment of the present invention will now be described.

An evaluation was made on changes in electrical characteristics depending on the amounts of bismuth oxide ($Bi_2O_3$), cobalt oxide ($Co_3O_4$) and manganese oxide ($Mn_3O_4$) under the condition wherein the amount of $Zn_2SnO_4$ added was kept constant, i.e., the amount of $Zn_2SnO_4$ added was kept at 5.00 mol %, to achieve surge resisting capability of 3000 A/cm$^2$ or more.

Specifically, varistor materials were prepared in the same manner as for the first embodiment; green sheets were formed; and chip processing was performed including formation of inner electrode layers, stacking, press-bonding and cutting. Outer electrodes were provided on baked chips to provide chip type varistors whose electrical characteristics were evaluated.

Figure 1B:
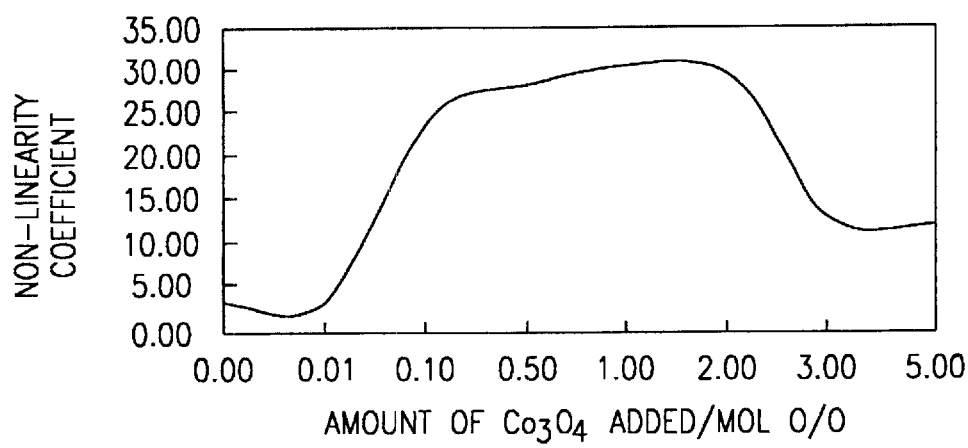
FIG. 1B is a graph showing the relationship between the amount of cobalt oxide added and the non-linearity coefficient according to the present invention.
Figure 1C:
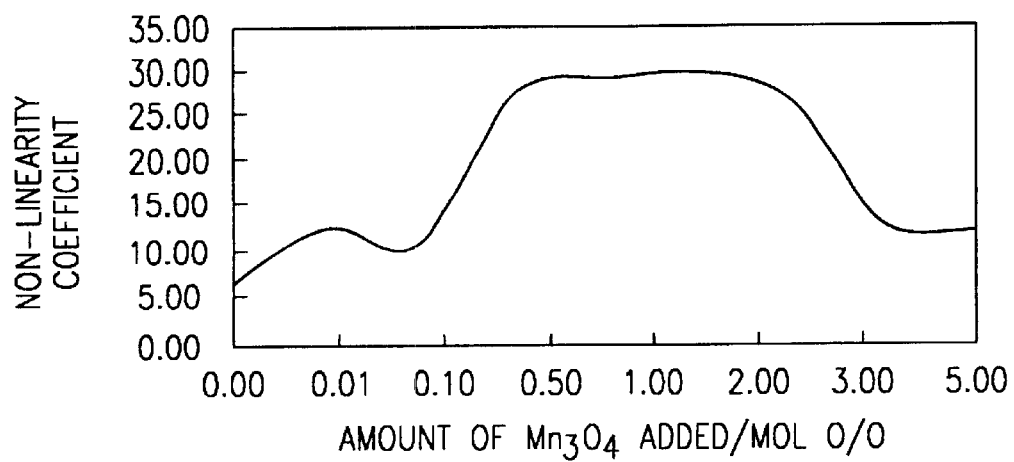
FIG. 1C is a graph showing the relationship between the amount of manganese oxide added and the non-linearity coefficient according to the present invention.
Figure 2A:
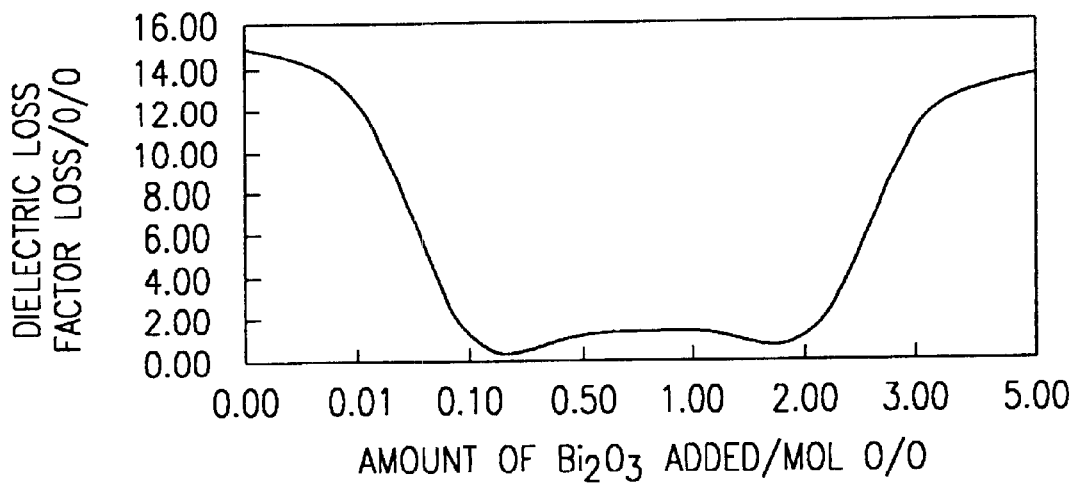
FIG. 2A is a graph showing the relationship between the amount of bismuth oxide added and the dielectric loss according to the present invention.
Figure 2B:
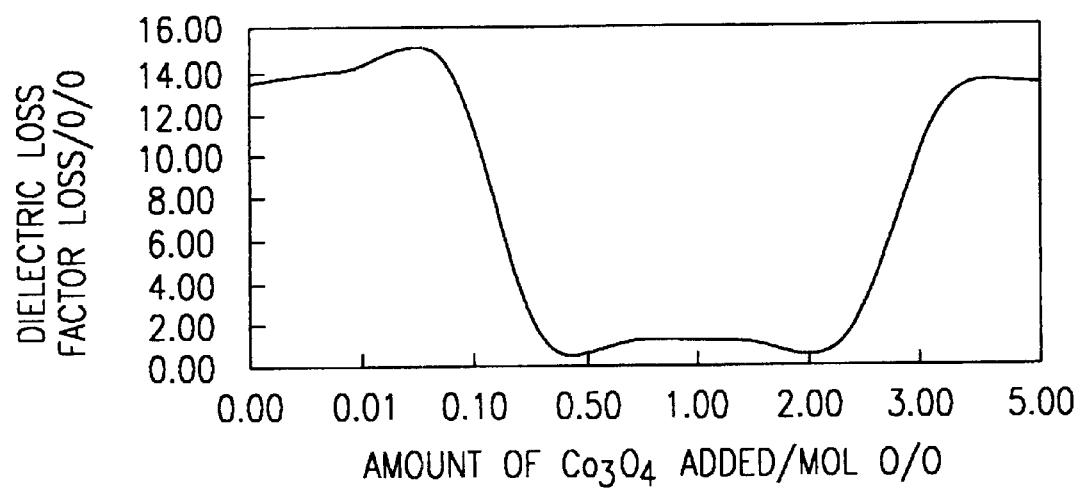
FIG. 2B is a graph showing the relationship between the amount of cobalt oxide added and the dielectric loss according to the present invention.
Figure 2C:
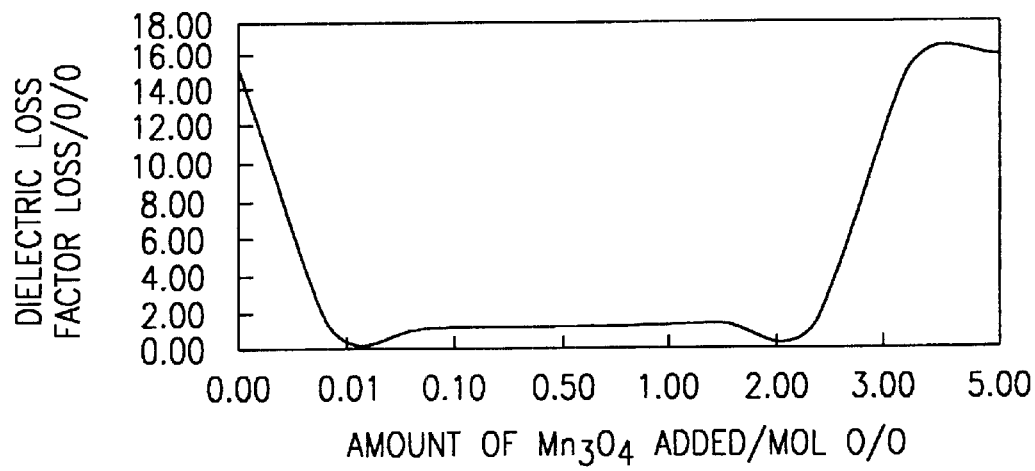
FIG. 2C is a graph showing the relationship between the amount of manganese oxide added and the dielectric loss according to the present invention.

FIGS. 1A through 1C show changes in the non-linearity coefficient depending on the added amount of each of the additives, i.e., bismuth oxide ($Bi_2O_3$), cobalt oxide ($Co_3O_4$) and manganese oxide ($Mn_3O_4$), and FIGS. 2A through 2C show changes in the dielectric loss depending on the added amount of each of the additives, i.e., bismuth oxide, cobalt oxide and manganese oxide.

As apparent from FIGS. 1A through 1C and FIGS. 2A through 2C, a reduction in the non-linearity coefficient and an increase in the dielectric loss were observed when the amount of each of bismuth oxide, cobalt oxide and manganese oxide added was outside of the amounts according to the present invention. Therefore, the amount of each of bismuth oxide, cobalt oxide and manganese oxide added is preferably in the range from about 0.10 to 2 mol %.

Although the $Zn_2SnO_4$ powder was added before the calcination of the ceramic raw material powders for varistors in the above-described embodiments, it is not essential to add it before calcination, and it will provide the same effect of improving surge resisting capability even when it is added after calcination. Further, although a conductive metal paste of Pt was used to form inner electrode layers, mixed Ag—Pd may be used instead. Furthermore, although the above-described embodiments have referred to chip type layered varistors, the present invention is not limited to this type of varistors and can provide the same effect when applied to single plate varistors and other types of varistors.

The present invention makes it possible to improve surge resisting capability per unit area of a zinc oxide type varistor and, consequently, to provide a varistor capable of absorbing surge noises of 3000 A/cm$^2$ even with a small size. Further, the present invention is effective in improving the voltage/current non-linearity and reliability of a varistor. Thus, the present invention can contribute to reduction of the size of an electronic component having a varistor function constituted by such a varistor and to improvement of the reliability thereof.

While the invention has been particularly shown and described with reference to preferred embodiments, it will be understood by those skilled in the art that various changes in form and detail may be made therein without departing from the spirit and scope of the invention.

What is claimed is:

1. A ceramic composition comprising zinc oxide and about 0.01 to 20 mol % of a previously formed composite oxide expressed by the formula $Zn_2SnO_4$, said composite oxide produced by the process of combining zinc oxide and tin oxide and heating the combination.

2. The ceramic composition according to claim 1, containing said composite oxide expressed by the formula $Zn_2SnO_4$ in an amount in the range from about 1 to 10 mol %.

3. The ceramic composition according to claim 2, containing bismuth oxide, cobalt oxide and manganese oxide.

4. The ceramic composition according to claim 3, containing about 0.10 to 2 mol % bismuth oxide, about 0.10 to 2 mol % cobalt oxide and about 0.10 to 2 mol % manganese oxide.

5. The ceramic composition according to claim 4, having an electrode interposed within the ceramic composition and an outer electrode formed on the surface of the ceramic composition and electrically connected to said inner electrode layer, whereby said structure functions as a varistor.

6. The ceramic composition according to claim 5, containing about 0.10 to 2 mol % bismuth oxide, about 0.10 to 2 mol % cobalt oxide and about 0.10 to 2 mol % manganese oxide.

7. The ceramic composition according to claim 1, containing bismuth oxide, cobalt oxide and manganese oxide.

8. The ceramic composition according to claim 7, having an electrode interposed within the ceramic composition and an outer electrode on the surface of the ceramic composition and electrically connected to said inner electrode layer, whereby said structure functions as a varistor.

9. The ceramic composition according to claim 1, having an electrode interposed within the ceramic composition and an outer electrode on the surface of the ceramic composition and electrically connected to said inner electrode layer, whereby said structure functions as a varistor.

10. A varistor comprising a body comprising at least two superposed ceramic layers each having a composition according to claim 1, an inner electrode interposed between two adjacent ceramic layers; and an outer electrode on the surface of said body and electrically connected to said inner electrode.

11. The varistor according to claim 10, wherein said composition contains bismuth oxide, cobalt oxide and manganese oxide.

12. The varistor according to claim 10, wherein said composition contains about 0.1 to 2 mol % bismuth oxide, about 0.1 to 2 mol % cobalt oxide, about 0.1 to 2 mol % manganese oxide and about 0.01 to 20 mol % $Zn_2SnO_4$.

13. A ceramic composition consisting essentially of zinc oxide and about 0.01 to 20 mol % of a previously formed composite oxide expressed by the formula $Zn_2SnO_4$, said composite oxide produced by the process of combining zinc oxide and tin oxide and heating the combination.

* * * * *